United States Patent
Pegram et al.

(10) Patent No.: US 11,486,418 B2
(45) Date of Patent: Nov. 1, 2022

(54) SEAL HOUSING

(71) Applicant: Metrol Springs Limited, Northampton (GB)

(72) Inventors: Christopher John Pegram, Northampton (GB); Paul Terence Hynes, Northampton (GB)

(73) Assignee: METROL SPRINGS LIMITED

(*) Notice: Subject to any disclaimer, the term of this patent is extended or adjusted under 35 U.S.C. 154(b) by 322 days.

(21) Appl. No.: 16/646,555

(22) PCT Filed: Aug. 28, 2018

(86) PCT No.: PCT/GB2018/052421
§ 371 (c)(1),
(2) Date: Mar. 11, 2020

(87) PCT Pub. No.: WO2019/053397
PCT Pub. Date: Mar. 21, 2019

(65) Prior Publication Data
US 2020/0271140 A1    Aug. 27, 2020

(30) Foreign Application Priority Data

Sep. 12, 2017 (GB) ...................................... 1714654

(51) Int. Cl.
| | | |
|---|---|---|
| *F15B 15/14* | (2006.01) | |
| *F16F 9/02* | (2006.01) | |
| *F16F 9/32* | (2006.01) | |

(52) U.S. Cl.
CPC ...... *F15B 15/1433* (2013.01); *F15B 15/1442* (2013.01); *F16F 9/0218* (2013.01); *F16F 9/0281* (2013.01); *F16F 9/3242* (2013.01)

(58) Field of Classification Search
CPC ... F15B 15/1461; F15B 15/1442; F16J 5/025; F16J 13/12
See application file for complete search history.

(56) References Cited

U.S. PATENT DOCUMENTS 5,070,767 A * 12/1991 Yuda ................... F15B 15/1442
                                                              92/128
5,301,777 A    4/1994 Handke
(Continued)

FOREIGN PATENT DOCUMENTS

| CN | 102269495 | 12/2011 |
| EP | 1270958 | 1/2003 |

(Continued)

OTHER PUBLICATIONS

PCT International Search Report on Patentability for PCT/GB2018/052421 dated Dec. 7, 2018, three pages.

*Primary Examiner* — Thomas E Lazo
(74) *Attorney, Agent, or Firm* — Merek, Blackmon & Voorhees, LLC (57) ABSTRACT

The present invention provides a seal housing (102) for releasable attachment to a hydraulic or pneumatic cylinder (101), the seal housing (102) being suitable for retaining a seal assembly and the seal housing (102) comprising a generally annular main body (201). The annular main body (201) defines an annular disc-shaped portion (202) having an upper surface (203), a lower surface (204), an outer peripheral edge (205) and an inner edge (206). Said inner edge (206) bounds a circular opening (207) extending the full height of said annular disc shaped portion (202) between said upper and lower surfaces (203, 204). The annular main body (201) further defines an annular collar portion (208) upstanding from the upper surface (203) of said disc shaped portion (202) adjacent said peripheral edge (205) of said disc shaped portion (202), said annular collar portion (208) extending height-wise from a base end (209) joined to said disc-shaped portion (202) to an upper end (210), and width-wise from an inner edge (211) to an outer peripheral edge (212), said inner edge (211) of said annular collar portion (208) bounding a circular opening (213) extending the full (Continued)

height of said annular collar portion (208). The annular main body (201) also further defines an annular flange portion (216) extending height-wise downwardly from the lower surface (204) of said disc-shaped portion (202) from a base end (217) joined to said lower surface (204) of said disc-shaped portion (202) to a distal end (218), and width wise from an inner edge (219) to an outer edge (220).

17 Claims, 6 Drawing Sheets

(56) References Cited

U.S. PATENT DOCUMENTS

| | | | |
|---|---|---|---|
| 6,263,779 | B1 | 7/2001 | Oliver et al. |
| 6,431,332 | B1 * | 8/2002 | Phelizot .................. F16F 9/435 188/286 |
| 9,157,500 | B2 * | 10/2015 | Cappeller ............. F16F 9/0218 |
| 2009/0194379 | A1 | 8/2009 | Maeda |
| 2011/0303084 | A1 * | 12/2011 | Cappeller ........... F15B 15/1428 92/169.1 |
| 2017/0051807 | A1 | 2/2017 | Fetibegovic |

FOREIGN PATENT DOCUMENTS

| | | | |
|---|---|---|---|
| EP | 2037148 | | 3/2009 |
| EP | 3184847 | | 6/2017 |
| FR | 1206366 | A * | 2/1960 .......... F15B 15/1461 |
| JP | 2009270668 | | 11/2009 |
| KR | 101456292 | | 11/2014 |

* cited by examiner

SEAL HOUSING

BACKGROUND OF THE INVENTION

1. Field of the Invention

The present invention relates to a seal housing for attachment to a linear actuator, and in particular to linear actuators in the form of hydraulic or pneumatic cylinders.

2. Description of the Related Art

Linear actuators are mechanisms that produce linear forces. Linear actuators have utility in a wide range of applications, notably in industrial machinery, for automated movement of components of the machinery, or for damping the movement of such components. Two types of linear actuator of particular interest are hydraulic cylinders and pneumatic cylinders. Hydraulic and pneumatic cylinders typically comprise a cylindrical housing defining internally a chamber for receiving the working fluid (gas/oil) and a circular opening at one end of the housing, and include a piston axially reciprocable within the housing through the opening.

A sealing assembly is usually installed in the housing opening annular about the piston so as to provide a substantially fluid tight seal between the piston and the housing. The sealing assembly usually defines an annular body fixed to the housing, and one or more annular 'sealing lips' formed of a resiliently deformable/compressible elastomeric material arranged to extend inwardly from the body to contact the piston and define a fluid (usually gas) tight seal.

The choice of material from which the sealing lips of the sealing assembly are formed will typically be matched to the intended use of the cylinder, considering factors such as the material choice for the piston and cylinder, and the expected temperature and pressure conditions under which the seal is required to operate (which conditions will also likely influence the choice of piston and cylinder material). Commonly the sealing lips may be formed of nitrile or fluoropolymer elastomer rubber materials, and common factors to be considered when choosing a sealing lip material may include the hardness, elasticity, and mechanical and chemical resilience of the material. Typically, the sealing lips of the sealing assembly must be relatively soft and flexible so as to allow the sealing lips to conform closely to the exterior of the piston thereby forming a good fluid seal. Additionally, in some applications the piston of the actuator may be formed of a relatively soft metal, and it is desirable in this instance that the sealing lips of the sealing are not formed of a hard material which could mechanically abrade the piston over time.

Problems can be encountered however when using a conventional linear actuator, such as a gas spring, incorporating a sealing assembly of the above type, inasmuch that the sealing lips of the sealing assembly may become damaged in use by contaminants, such as moisture, dust, dirt or other foreign objects, adhered to the piston. If the sealing lips become damaged then not only could the contaminants adhered to the piston be allowed to enter the housing, but pressurised fluid, such as gas, within the housing could be allowed to escape to atmosphere. In such an event it would be necessary to remove the actuator unit from service to allow the seal to be replaced, potentially resulting in significant servicing and down-time expense.

The noted problems associated with contaminants adhering to the piston are exacerbated when a single specification of hydraulic or pneumatic cylinder is employed in differing applications. As an example, in some circumstances it is desirable, at least for reason of efficiency, to manufacture a cylinder to a single specification that is suitable for use in a variety of applications and so operating environments. In this instance, a sealing assembly optimised, for example, for use in a low-contaminant level environment, could be unsuitable for use in a high-contaminant level environment.

To mitigate problems associated with contaminants damaging the sealing lips of a sealing assembly, it is known to incorporate into the sealing assembly of a pneumatic or hydraulic cylinder a 'wiper' or 'scraper' lip, typically formed of a relatively hard plastic such as polyurethane, or of a metal material such as brass. The scraper lip is typically arranged outermost in the sealing assembly, in front of the sealing lip, such that contaminants adhered to the piston come into contact firstly with the scraper lip which acts to scrape the contaminants from the surface of the piston. As will be understood, given that the scraper is not generally required to form the fluid tight seal, that role being performed by the sealing lip, the scraper lip may be formed of a relatively harder material than the sealing lip and may thus be less susceptible to damage by incident contaminants.

However, just as a sealing assembly without a scraper lip may be unsuitable for all applications, a sealing assembly including a scraper lip may not be suited to certain uses of the cylinder, or at least may be sub-optimal. Accordingly, it is desirable in certain instances to provide means for releasable attachment of an auxiliary seal component, and preferably an auxiliary seal component comprising a scraper lip, to a hydraulic or pneumatic cylinder. More particularly, in certain instances it is desirable to provide means for releasable attachment of an auxiliary seal component to an existing sealing assembly of a hydraulic or pneumatic cylinder.

BRIEF SUMMARY OF THE INVENTION

According to a first aspect of the present invention, there is provided a seal housing for releasable attachment to a hydraulic or pneumatic cylinder, the seal housing being suitable for retaining a seal assembly and the seal housing comprising a generally annular main body, the annular main body defining:

an annular disc-shaped portion having an upper surface, a lower surface, an outer peripheral edge and an inner edge, said inner edge bounding a circular opening extending the full height of said annular disc shaped portion between said upper and lower surfaces;

an annular collar portion upstanding from the upper surface of said disc shaped portion adjacent said peripheral edge of said disc shaped portion, said annular collar portion extending height-wise from a base end joined to said disc-shaped portion to an upper end, and width-wise from an inner edge to an outer peripheral edge, said inner edge of said annular collar portion bounding a circular opening extending the full height of said annular collar portion; and an annular flange portion extending height-wise downwardly from the lower surface of said disc-shaped portion from a base end joined to said lower surface of said disc-shaped portion to a distal end, and width wise from an inner edge to an outer edge.

Preferably, said annular flange portion comprises height-wise spaced first and second portions.

Preferably, said second portion is closer than said first portion to said distal end of said flange portion.

Preferably, said second portion is a resiliently compressible portion that is resiliently compressible width-wise of the flange portion.

Preferably, said second portion of said annular flange portion has a greater width than said first portion of said annular flange portion.

Preferably, the increased width of said second portion of said annular flange portion defines a protrusion to the inner surface of the annular flange portion extending radially inwardly towards the centre of the circular opening defined by the inner edge of the annular flange portion.

Preferably, said annular flange portion is resiliently flexible relative to said annular disc-shaped portion generally about its base end.

Preferably, said annular flange portion is resiliently flexible along its height.

Preferably, the cross-sectional profile of said annular flange portion is uniform about its full circumference.

Preferably, said resiliently compressible portion of said annular flange portion is formed proximal said distal end thereof.

Preferably, the diameter of said circular opening defined by said annular collar portion is greater than the diameter of said circular opening defined by said annular disc-shaped portion Preferably, the radial width of said annular flange portion is substantially less than the radial width of said annular collar portion.

Preferably, said annular disc-shaped portion, said annular collar portion, and said annular flange portion have a unitary construction.

Preferably, said annular disc-shaped portion, said annular collar portion, and said annular flange portion are defined by a unitary moulding.

Preferably, said annular disc-shaped portion, said annular collar portion, and said annular flange portion are formed of a plastics material.

Preferably, said annular disc-shaped portion, said annular collar portion, and said annular flange portion are formed of a Polyoxymethylene (POM) thermoplastics material.

Preferably, the height of said annular collar portion is substantially greater than the height of said annular disc-shaped portion.

Preferably, the height of said annular flange portion is substantially greater than its width at its widest section.

Preferably, said annular collar portion is generally tubular in form.

Preferably, said annular flange portion is generally tubular in form.

Preferably, said inner edge of said annular collar portion extends substantially orthogonally relative to the upper surface of said annular disc-shaped portion.

Preferably, said upper surface of said annular disc-shaped portion is substantially planar.

Preferably, a circular opening is defined by said annular flange portion bounded by said inner edge of said annular flange portion, said circular opening extending the full height of said annular flange portion.

Preferably, said main body is suitable for retaining an annular seal assembly within the volume bounded by the plane of the upper surface of the annular disc-shaped portion, the inner edge of the annular collar portion, and a plane aligned with the upper end of said annular collar portion.

Preferably, said seal housing further comprises an annular seal assembly retained within the volume bounded by the plane of the upper surface of the annular disc-shaped portion, the inner edge of the annular collar portion, and a plane aligned with the upper end of said annular collar portion.

Preferably, said annular seal assembly is retained in place with respect to said main body by means of an interference fit between an exterior surface of the sealing assembly and said inner edge of said annular collar portion.

Preferably, said annular seal assembly comprises a scraper seal defining a sealing lip adapted to scrape contaminants from the surface of the piston of a pneumatic or hydraulic cylinder to which the seal housing may be attached.

Preferably, said seal housing is adapted for releasable attachment to a hydraulic or pneumatic cylinder comprising a cylindrical housing defining internally a chamber for receiving a working fluid and defining a circular opening through one end face of the housing, and further comprising a piston axially reciprocable within the housing through the opening; in which said seal housing is configured for attachment to said end face of said housing coaxially with said circular opening; and in which said seal housing is configured for retaining an annular seal assembly comprising a sealing lip in contact with said piston.

Preferably, said annular flange portion is adapted to be received in a correspondingly shaped channel defined by a hydraulic or pneumatic cylinder to facilitate attachment of said seal housing thereto.

According to a second aspect of the present invention, there is provided a hydraulic or pneumatic cylinder comprising:

a cylindrical housing defining internally a chamber for receiving a working fluid and defining a circular opening through one end face of the housing;

a piston axially reciprocable within the housing through the opening; and a seal housing releasably attached to said end face of said housing, said seal housing retaining an annular seal assembly comprising an annular sealing lip in contact with said piston;

in which the seal housing comprises a generally annular main body, the annular main body defining:

an annular disc-shaped portion having an upper surface, a lower surface, an outer peripheral edge and an inner edge, said inner edge bounding a circular opening extending the full height of said annular disc shaped portion between said upper and lower surfaces;

an annular collar portion upstanding from the upper surface of said disc shaped portion adjacent said peripheral edge of said disc shaped portion, said annular collar portion extending height-wise from a base end joined to said disc-shaped portion to an upper end, and width-wise from an inner edge to an outer peripheral edge, said inner edge of said annular collar portion bounding a circular opening extending the full height of said annular collar portion; and an annular flange portion extending height-wise downwardly from the lower surface of said disc-shaped portion from a base end joined to said lower surface of said disc-shaped portion to a distal end, and width wise from an inner edge to an outer edge.

Preferably, said annular flange portion comprises height-wise spaced first and second portions.

Preferably, said second portion is closer than said first portion to said distal end of said flange portion.

Preferably, said second portion is a resiliently compressible portion that is resiliently compressible width-wise of the flange portion.

Preferably, said second portion of said annular flange portion has a greater width than said first portion of said annular flange portion.

Preferably, the increased width of said second portion of said annular flange portion defines a protrusion to the inner surface of the annular flange portion extending radially inwardly towards the centre of the circular opening defined by the inner edge of the annular flange portion.

Preferably, said annular flange portion is resiliently flexible relative to said annular disc-shaped portion generally about its base end.

Preferably, said annular flange portion is resiliently flexible along its height.

Preferably, said hydraulic or pneumatic cylinder defines a channel proximal said end face thereof, and in which said annular flange portion is received in said channel to facilitate attachment of said seal housing thereto.

According to a third aspect of the present invention, there is provided a seal housing for releasable attachment to a hydraulic or pneumatic cylinder, the seal housing being suitable for retaining a seal assembly and the seal housing comprising a generally annular main body, the annular main body defining:

an annular disc-shaped portion having an upper surface, a lower surface, an outer peripheral edge and an inner edge, said inner edge bounding a circular opening extending the full height of said annular disc shaped portion between said upper and lower surfaces;

an annular collar portion upstanding from the upper surface of said disc shaped portion adjacent said peripheral edge of said disc shaped portion, said annular collar portion extending height-wise from a base end joined to said disc-shaped portion to an upper end, and width-wise from an inner edge to an outer peripheral edge, said inner edge of said annular collar portion bounding a circular opening extending the full height of said annular collar portion; and an annular flange portion extending height-wise downwardly from the lower surface of said disc-shaped portion from a base end joined to said disc-shaped portion to a distal end, and width wise from an inner edge to an outer edge, said inner edge of said annular flange portion bounding a circular opening extending the full height of said annular flange portion, the diameter of said opening defined by said flange portion being greater than the diameter of said opening defined by said annular disc-shaped portion;

in which a first annular region of said lower surface of said annular disc-shaped portion extends in a first plane defining a height-wise lowermost extent of said lower surface of said disc-shaped portion, and in which said lower surface of said annular disc-shaped portion is concaved inwardly of said annular disc-shaped portion away from said first plane at a second annular region, said second annular region being directly adjacent and surrounding said circular opening and extending radially outwards towards the region at which said annular flange portion is joined to said annular disc-shaped portion.

Preferably, said first and second annular regions of said lower surface of said annular disc-shaped portion are approximately concentric and centred on the centre of said opening of said annular disc shaped portion, said first annular region have a greater radius than said second annular region, and said first annular region extending radially outwards of said second annular region towards said outer peripheral edge of said annular disc-shaped portion.

Preferably, said first annular region is directly adjacent and surrounding said second annular region.

Preferably, the radial width of said first annular region is substantially greater than the radial width of said second annular region.

Preferably, said annular flange portion comprises height-wise spaced first and second portions.

Preferably, said second portion is closer than said first portion to said distal end of said flange portion.

Preferably, said second portion is a resiliently compressible portion that is resiliently compressible width-wise of the flange portion.

Preferably, said second portion of said annular flange portion has a greater width than said first portion of said annular flange portion.

Preferably, the increased width of said second portion of said annular flange portion defines a protrusion to the inner surface of the annular flange portion extending radially inwardly towards the centre of the circular opening defined by the inner edge of the annular flange portion.

Preferably, said annular flange portion is resiliently flexible relative to said annular disc-shaped portion generally about its base end.

Preferably, said annular flange portion is resiliently flexible along its height.

Preferably, the cross-sectional profile of said annular flange portion is uniform about its full circumference.

Preferably, said resiliently compressible portion of said annular flange portion is formed proximal said distal end thereof.

Preferably, the diameter of said circular opening defined by said annular collar portion is greater than the diameter of said circular opening defined by said annular disc-shaped portion Preferably, the radial width of said annular flange portion is substantially less than the radial width of said annular collar portion.

Preferably, said annular disc-shaped portion, said annular collar portion, and said annular flange portion have a unitary construction.

Preferably, said annular disc-shaped portion, said annular collar portion, and said annular flange portion are defined by a unitary moulding.

Preferably, said annular disc-shaped portion, said annular collar portion, and said annular flange portion are formed of a plastics material.

Preferably, said annular disc-shaped portion, said annular collar portion, and said annular flange portion are formed of a Polyoxymethylene (POM) thermoplastics material.

Preferably, the height of said annular collar portion is substantially greater than the height of said annular disc-shaped portion.

Preferably, the height of said annular flange portion is substantially greater than its width at its widest section.

Preferably, said annular collar portion is generally tubular in form.

Preferably, said annular flange portion is generally tubular in form.

Preferably, said inner edge of said annular collar portion extends substantially orthogonally relative to the upper surface of said annular disc-shaped portion.

Preferably, said upper surface of said annular disc-shaped portion is substantially planar.

Preferably, a circular opening is defined by said annular flange portion bounded by said inner edge of said annular flange portion, said circular opening extending the full height of said annular flange portion.

Preferably, said main body is suitable for retaining an annular seal assembly within the volume bounded by the plane of the upper surface of the annular disc-shaped portion, the inner edge of the annular collar portion, and a plane aligned with the upper end of said annular collar portion.

Preferably, said seal housing further comprises an annular seal assembly retained within the volume bounded by the plane of the upper surface of the annular disc-shaped portion, the inner edge of the annular collar portion, and a plane aligned with the upper end of said annular collar portion.

Preferably, said annular seal assembly is retained in place by means of an interference fit between an exterior surface of the sealing assembly and said inner edge of said annular collar portion.

Preferably, said annular seal assembly comprises a scraper seal defining a sealing lip adapted to scrape contaminants from the surface of the piston of a pneumatic or hydraulic cylinder to which the seal housing may be attached.

Preferably, said seal housing is adapted for releasable attachment to a hydraulic or pneumatic cylinder comprising a cylindrical housing defining internally a chamber for receiving a working fluid and defining a circular opening through one end face of the housing, and further comprising a piston axially reciprocable within the housing through the opening; in which said seal housing is configured for attachment to said end face of said housing coaxially with said circular opening; and in which said seal housing is configured for retaining an annular seal assembly in sealing contact with said piston.

Preferably, said annular flange portion is adapted to be received in a correspondingly shaped channel defined by a hydraulic or pneumatic cylinder to facilitate attachment of said seal housing thereto.

BRIEF DESCRIPTION OF THE DRAWINGS

The invention will now be described by way of example only with reference to the accompanying drawings, which are purely schematic and not to scale, of which.

DETAILED DESCRIPTION OF EXAMPLE EMBODIMENTS

Figure 1A:
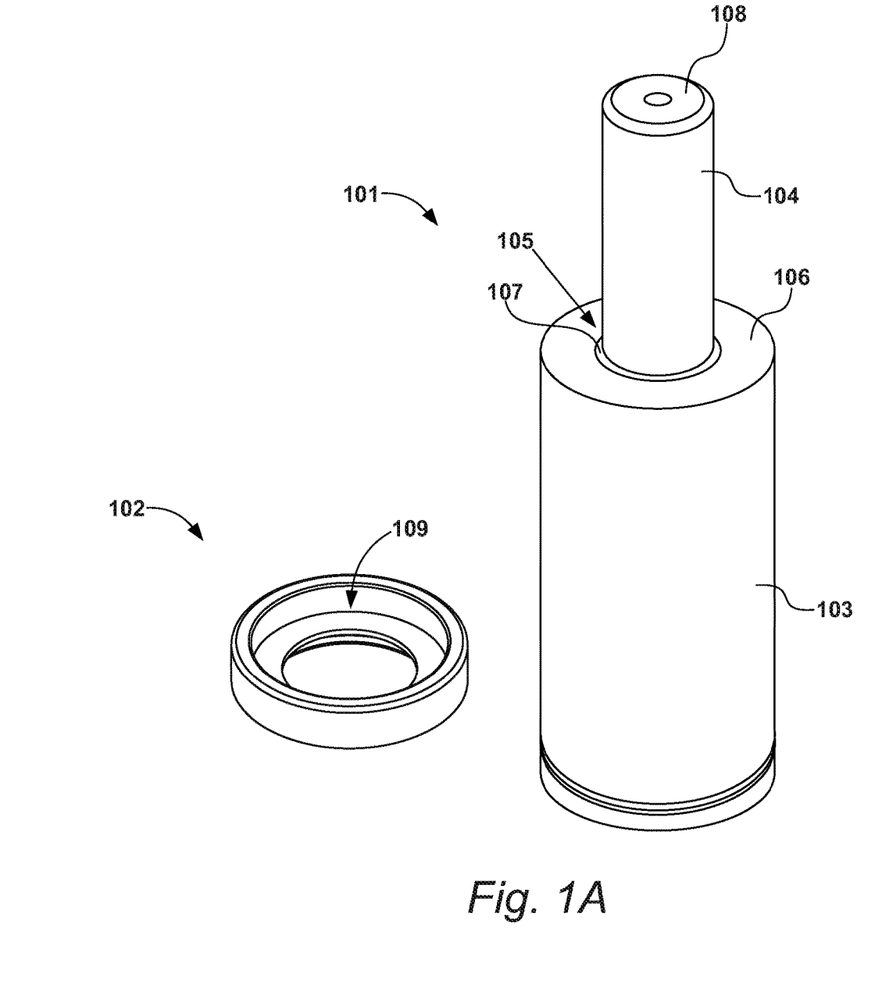
FIGS. 1A and 1B show a pneumatic cylinder in the form of a gas spring and a seal housing each according to one embodiment of the present invention in a pair of perspective views.
Figure 1B:
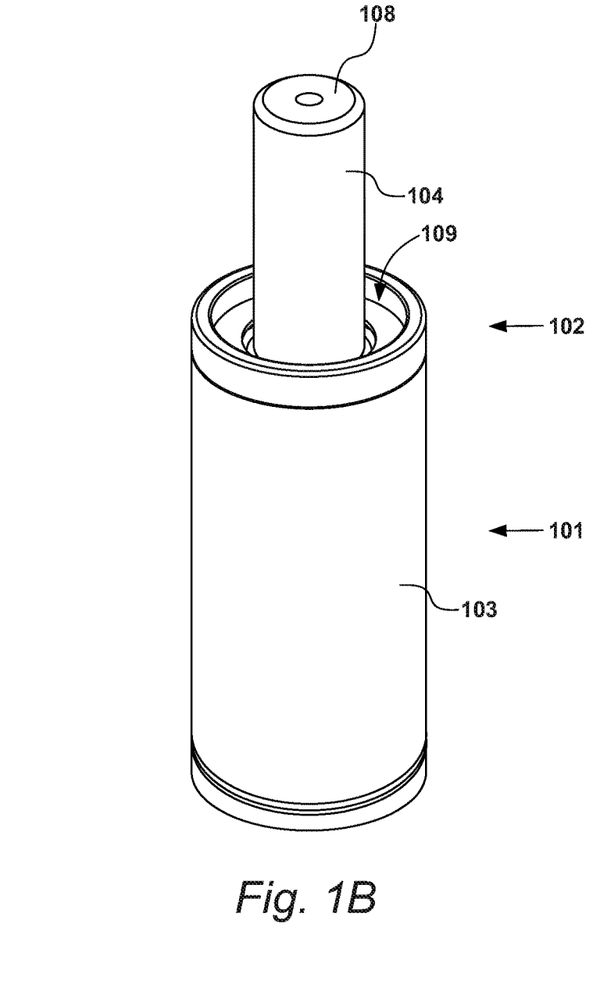

FIG. 1

A pneumatic cylinder in the form of a gas spring 101 and a seal housing 102 suitable for attachment to the gas spring 101, each according to one embodiment of the present invention are shown in FIGS. 1A and 1B in a pair of perspective views. In FIG. 1A the seal housing is shown detached from the pneumatic cylinder, whilst in FIG. 1B the seal housing is shown attached to the pneumatic cylinder.

Aspects of the present invention relate to a seal housing for releasable attachment to a hydraulic or pneumatic cylinder, and to a hydraulic or pneumatic cylinder comprising a seal housing releasably attached thereto. As will be understood, in the context, references to 'a pneumatic cylinder' or 'a hydraulic cylinder' are references to different forms of linear actuator. A specific embodiment of the invention described herein in detail is a pneumatic cylinder. More particularly, the specific embodiment of the invention described herein is a pneumatic cylinder configured as a 'gas spring'. As will be understood, a gas spring is a type of spring that, unlike a typical metal spring, uses a compressed gas, contained in a cylinder and compressed by a piston, to exert a (retarding) force on an object (typically a moving component of an industrial machine).

One use for such a gas spring that is of particular interest to the present applicant is a gas spring for supporting a blank-holder in a metal-pressing machine. Thus, in the specific embodiment described herein, the gas spring is a gas spring suitable for exerting a force on a blank-holder resting thereon in a metal pressing machine. It will of course be appreciated however that, although the specific embodiment of the invention described herein is a gas spring, the invention could alternatively embody a seal housing for attachment to an alternative form of pneumatic cylinder, or even a seal housing for attachment to a hydraulic cylinder. As an example, in an alternative embodiment aspects of the invention may take the form of a seal housing for attachment to a hydraulic 'ram' cylinder, and to a hydraulic cylinder comprising a seal housing attached thereto. Moreover, it will be appreciated that gas springs, and linear actuators more generally, have utility in a number of different applications other than for supporting a blank-holder in a pressing machine, and it should be understood that the invention is not limited in this regard to any one particular intended application, rather has broader utility.

Referring to the Figures, a pneumatic cylinder in the form of a gas spring 101 is shown, along with a seal housing 102 suitable for attachment to the gas spring 101. Gas spring 101 is substantially conventional in construction, comprising principally of a generally cylindrical housing 103 defining internally a generally cylindrical compression chamber (not visible in the Figure), and a piston 104 reciprocable within the housing 103. As is conventional, the housing 103 defines a circular opening 105 through one axial end face 106, through which opening 105 the piston 104 extends, generally coaxially with the housing 103. A substantially fluid-tight piston sealing assembly 107 is provided annular about said piston 104. As will be understood, the primary function of said piston sealing assembly 107 is to form a sliding seal between the housing 103 and the piston 104, to thereby contain the working fluid, i.e. a gas in the case of gas spring 101, within the cylinder housing 103 and prevent it escaping in the gap between the housing 103 and the exterior of the piston 104.

As is conventional, the piston 104 may reciprocate within the compression chamber between an extended condition in which the piston extends to a maximum extent from the housing, i.e. where the piston is at its minimum extent of insertion into the compression chamber, and a retracted condition in which the piston extends to a minimum extent from the housing, i.e. where the piston is at its maximum extent of insertion into the compression chamber. In the case of a gas spring 101, piston 104 is generally required to reciprocate within the housing 103 when the piston crown 108 is contacted by a moving object, for example, a component of an industrial machine, to thereby damp or retard the motion of the machine component.

Seal housing 102 is configured for attachment of a piston seal assembly to said pneumatic cylinder 101. Thus, as illustrated, seal housing 102 is itself adapted for releasable attachment to said pneumatic cylinder 101, such that a lower surface of the seal housing abuts the end face 106 of cylinder housing 103, and said seal housing 102 defines a void, indicated generally at 109, within which void a seal assembly may be retained. In the specific embodiment, and as will be described further with particular reference to FIGS. 3A and 3B, said seal housing 102 is configured for attachment to the piston seal assembly 107 of said pneumatic cylinder 101. Moreover, in the specific embodiment, the seal housing 102 is adapted for releasable attachment to the piston seal assembly 107 of said pneumatic cylinder 101, in a manner such that the seal formed by said piston seal assembly 107 between said cylinder housing 103 and said piston 104 is not interrupted by attachment or detachment of said seal housing 102 therefrom.

FIGS. 2A, 2B, 2C, 2D, 2E & 2F

Seal housing 102 is shown in FIGS. 2A, 2B, 2C, 2D, 2F & 2E, in top perspective, bottom perspective, top plan, bottom plan, side elevation and side cross-sectional views respectively.

Referring to the Figures, seal housing 102 comprises a generally annular main body 201, said main body 201 defining a circular opening extending height-wise completely therethrough, through which opening piston 104 extends when said seal housing 102 is attached to said pneumatic cylinder 101 (as previously described with references to FIG. 1B. Said main body 201 defines principally an annular disc-shaped portion 202 having a generally planar upper surface 203, a generally planar lower surface 204, an outer peripheral edge 205, and an inner edge 206. The inner edge 206 bounds a circular opening 207 extending the full height of the disc-shaped portion 202 between said upper surface 203 and said lower surface 204, and which thus constitutes a portion of the previously described opening extending completely through the main body 201.

Said main body 201 further defines a generally tubular collar portion 208 upstanding from the upper surface 203 of said disc-shaped portion 202 adjacent the peripheral edge 205 thereof. As illustrated, said collar portion 208 is joined at a base end 209 thereof to said disc-shaped portion 202 and extends orthogonally upwardly from the plane of said upper surface 203 height-wise towards an upper end 210. In the embodiment, said annular collar portion 208 is generally rectangular in cross section, and defines an inner edge 211 and a width-wise spaced outer peripheral edge 212. Said collar portion 208 defines a circular opening 213, extending the full height of the collar portion and bounded by the inner edge 211 thereof.

As previously described, the primary function of said seal housing 102 is to allow for releasable attachment of an auxiliary sealing assembly to said gas spring 101. Thus, the main body 201 of said seal housing 102 defines a volume 109 bounded by the plane 214 of the upper surface of the disc-shaped portion 202, the inner edge 211 of the annular collar portion 208, and a plane 215 aligned with the upper end 210 of the annular collar portion 208, within which volume 109 an auxiliary sealing assembly may be retained.

Said main body 201 further defines a generally tubular annular flange portion 216 extending height-wise downwardly generally away from the lower surface 204 of said disc-shaped portion 202, from a base end 217 joined to said lower surface 204 of said disc-shaped portion 202, to a distal end 218, and extends width-wise from an inner edge 219 to an outer edge 220. As will be understood, said flange portion 216 facilitates releasable attachment of said seal housing 102 to a hydraulic or pneumatic cylinder, such as gas spring 101.

Figure 2A:
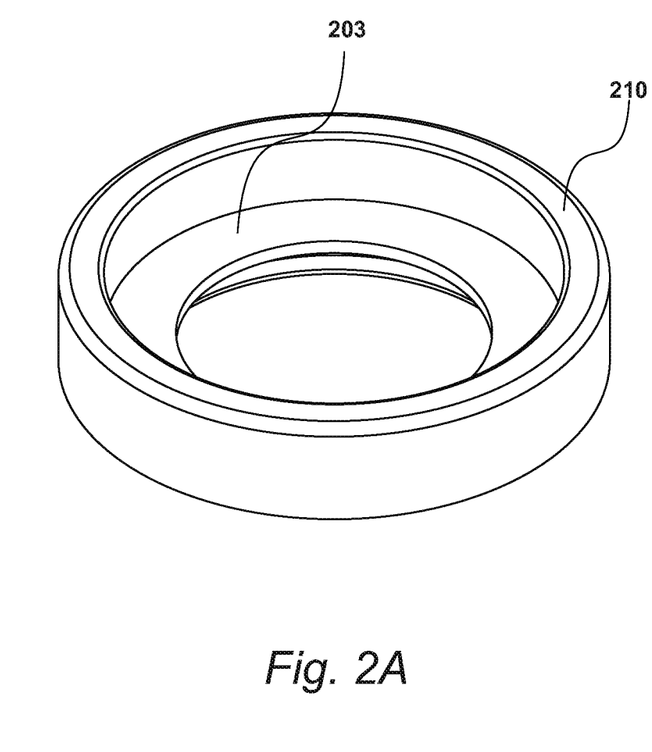
FIGS. 2A, 2B, 2C, 2D, 2F & 2E, show the seal housing previously identified with reference to FIGS. 1A and 1B in top perspective, bottom perspective, top plan, bottom plan, side elevation and side cross-sectional views respectively.
Figure 2B:
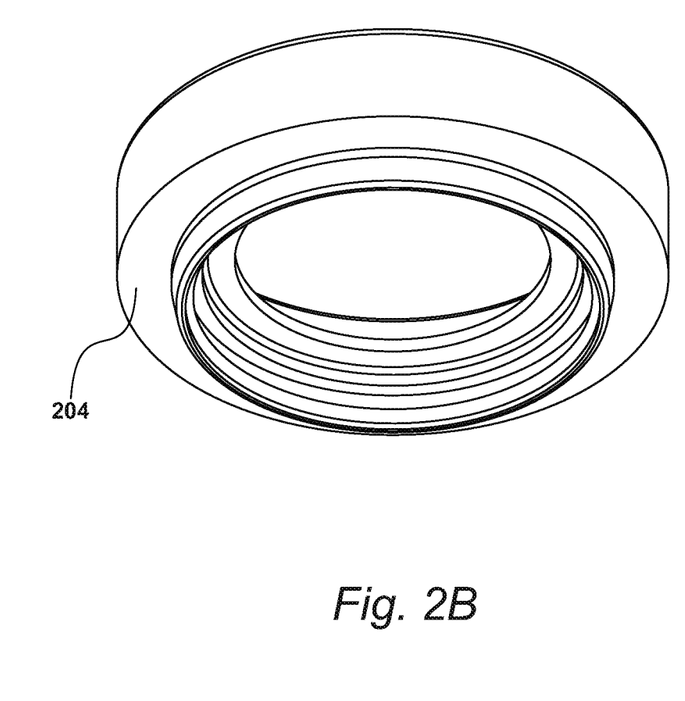
Figure 2C:
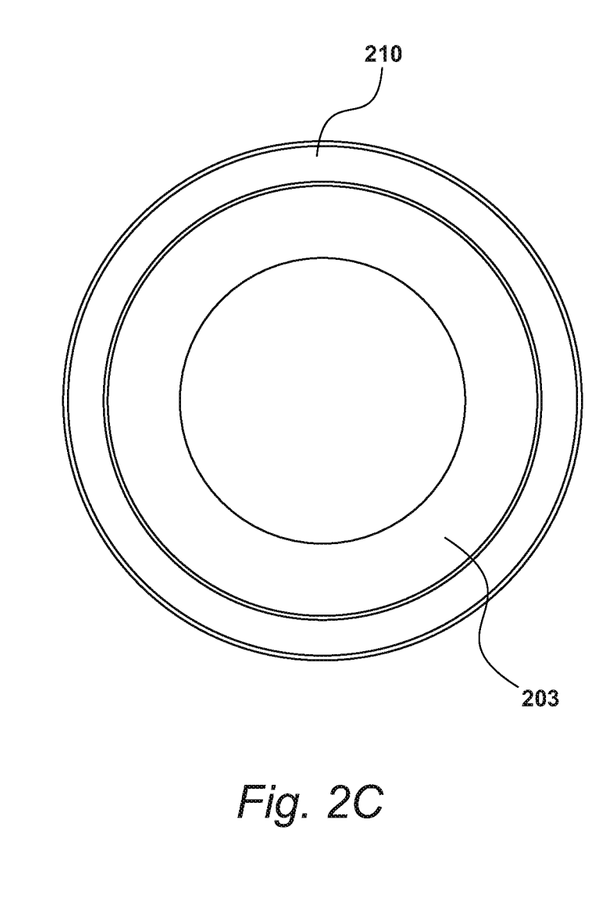
Figure 2D:
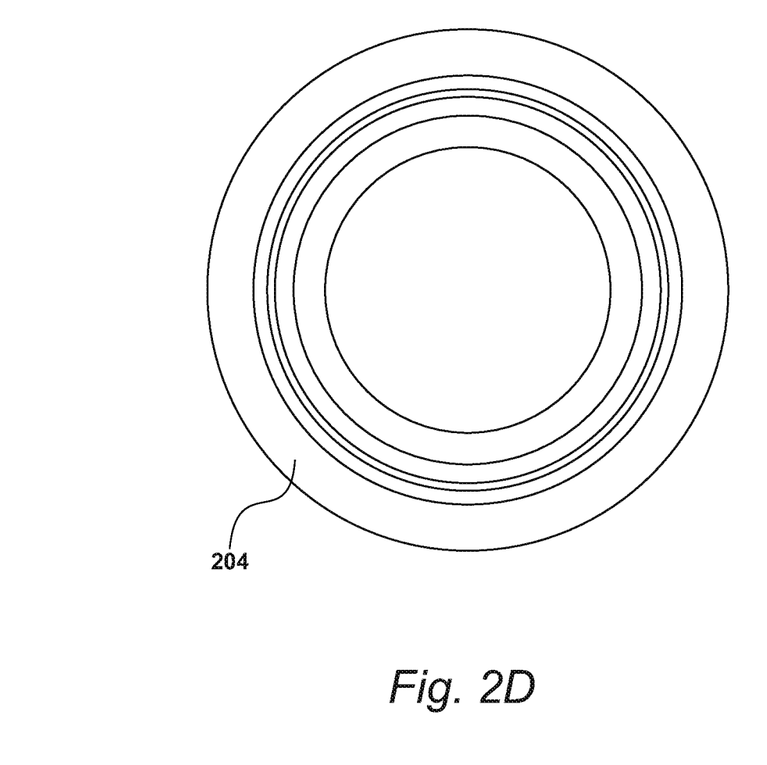
Figure 2E:
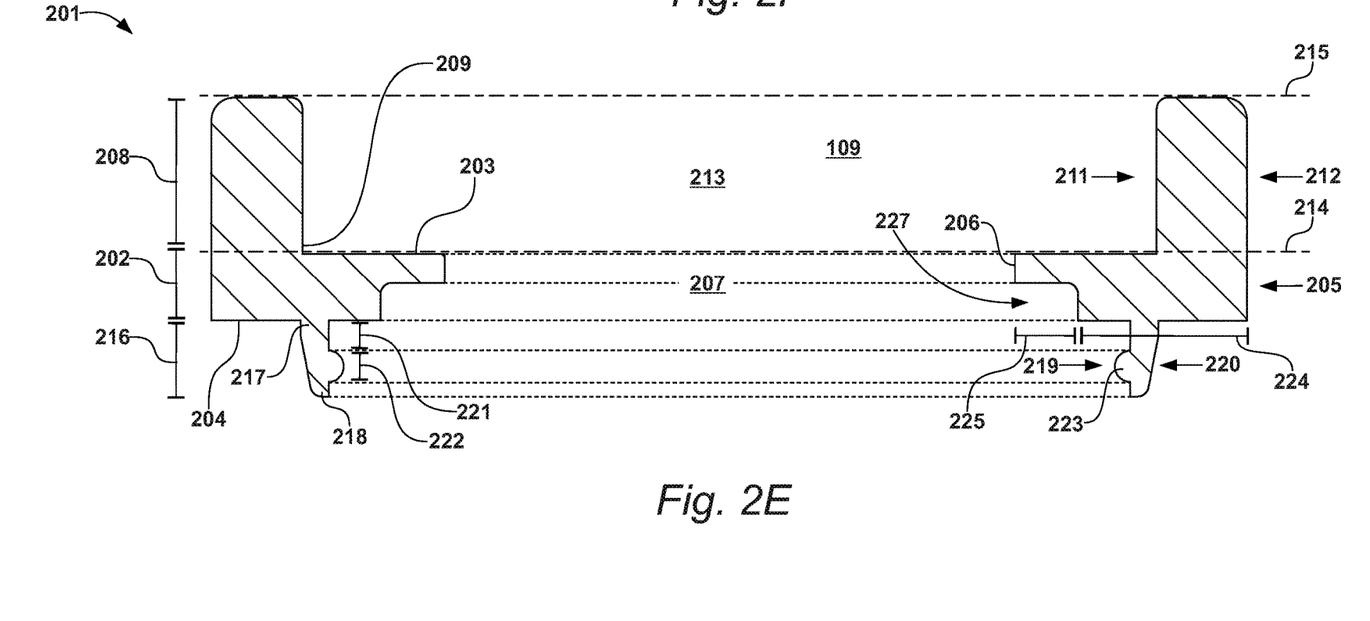
Figure 2F:
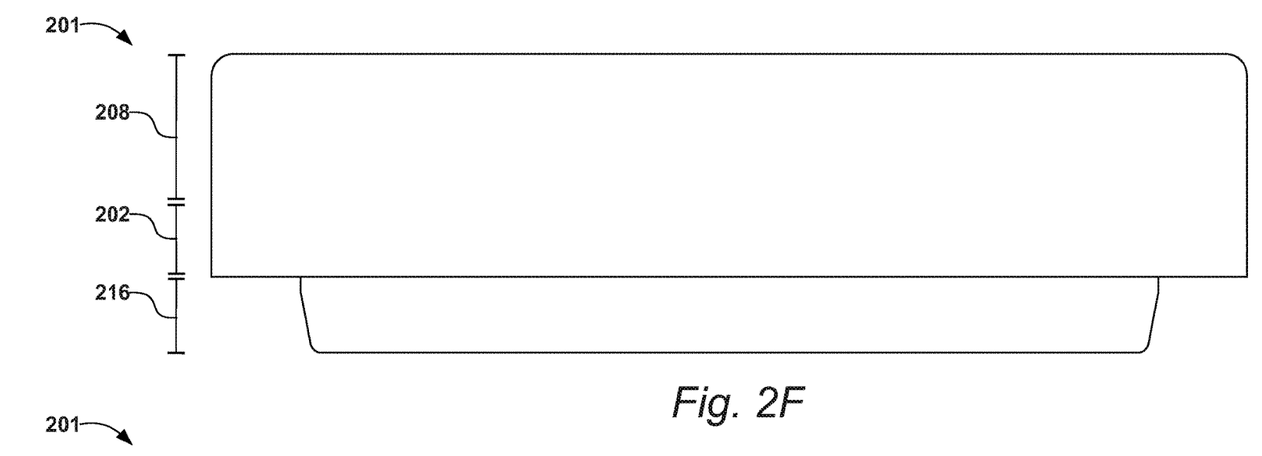

As will be described to facilitate releasable attachment of said seal housing 102 to said gas spring 101, said flange portion 216 may be provided with a resiliently compressible portion configured to be received in a correspondingly shaped channel defined by the gas spring 101. In a preferred embodiment the resiliently compressible portion is defined by a portion of the flange portion 216 closest to the distal end 218, and more preferably the resiliently compressible portion has a greater width than a portion of the flange portion 216 that is closest to the base end 217 thereof.

As an alternative, or in addition to a resiliently compressible portion, said flange portion 216 may comprise simply a portion closest to the distal end 218 thereof that has a greater width than a portion closest to the base end 217 thereof. The increased width portion may or may not be resiliently compressible. In the instance that the flange portion 216 is configured for insertion into a channel defined by a resiliently compressible portion of the gas spring 101, such that the channel defined by the gas spring itself may be enlarged to accept the increased width portion of the flange portion 216, it is not required that the flange portion 216 comprises a resiliently compressible portion. In this alternative embodiment however the increased width portion will preferably also be resiliently compressible widthwise of the flange portion 216. In the specific embodiment, as will be described, said flange portion 216 comprises a resiliently compressible portion with an increased width.

Referring in particular to FIG. 2E, height-wise said annular flange portion defines a first portion 221 proximal said base end 217, and a second portion 222 proximal said distal end 218, which second portion 222 is resiliently compressible width-wise of the annular flange portion 216. As shown in FIG. 2E, in the specific embodiment, said resiliently compressible portion 222 has a greater (uncompressed) width than said first portion 221, the increased width, defining a bulbous protrusion (indicated generally at 223) to the inner surface 219 of the flange portion 216, the protrusion 223 extending radially inwards generally towards the centre of the central opening defined by the flange portion.

As will be described with reference to later Figures, said resiliently compressible bulbous portion 223 of said flange portion 216 facilitates releasable attachment of the seal housing 102 to a pneumatic or hydraulic cylinder, such as gas spring 101, as said resiliently compressible portion 223 may be resiliently compressed to allow insertion of said flange portion into a correspondingly shaped channel defined in the gas spring. The channel may preferably have a cross section generally matching that of said flange portion 216, such that said resiliently compressible bulbous portion is received in a correspondingly shaped enlargement to the channel, thereby resisting withdrawal of the flange portion 216 from the channel. As will be appreciated, said resiliently compressible portion 223 is, in the specific embodiment, required only to compress a relatively small amount to facilitate its secure releasable attachment to said gas spring 101. Specifically, in the particular embodiment, said resiliently compressible portion is required only to be compressible to an extent such that the width of said resiliently compressible portion may be compressed to approximately two-thirds of its uncompressed width.

In the specific embodiment, said annular flange portion 216 is resiliently flexible, both about its base end 217 where it attaches to the disc-shaped portion 202, and along its height. A degree of resilient flexibility of the annular flange portion 216 is preferable as it more easily allows for attachment/detachment of the seal housing 102 to/from gas spring 101, by easing insertion/removal of the flange portion 216 from a correspondingly shaped channel defined by the gas spring, as will be described further with reference to later Figures.

Furthermore, referring again in particular to FIG. 2E, in the specific embodiment said generally planar lower surface 204 of said disc-shaped portion defines first and second concentric annular regions 224, 225 respectively. Said second annular region 225 is directly adjacent to and surrounds said circular opening 207, such that an innermost extent of said second annular region 225 is defined by said inner edge 206. Said second annular region 225 extends radially outwards from said inner edge 206 to said first annular region 224, said first annular region 224 extending radially outwardly from the outer extent of said second annular region 225 to said outer peripheral edge 205 of said annular disc-shaped portion 202, the outermost extent of said first annular region 224 thus being defined by said outer edge 205.

As shown in FIG. 2E, the lower surface 204 of said disc-shaped portion 202 at said first annular region 224 extends in a first plane 226, thereby defining a lowermost extent of the lower surface 204 of the disc-shaped portion 202, and the lower surface 204 at said second annular region 225 is concaved inwardly of said disc-shaped portion away from said plane 226 defining a concaved portion 227. In the specific embodiment the lower surface 204 is concaved at said second annular region away from said plane 226 to a depth of approximately three millimetres, although it will be appreciated that in alternative embodiments the lower surface 204 may be concaved to a greater or lesser extent. For example, in other preferred embodiments of the invention, the lower surface 204 at the second annular region may be concaved away from said plane 226 to depths of approximately one millimetre or less, approximately two millimetres, approximately four millimetres, approximately five millimetres, or to an even greater depth.

As will be described with reference to later Figures, said concaved portion 227 of said disc-shaped portion 202 allows for attachment of the seal housing 102 to gas spring 101 in a way such that the sealing lips of the piston seal assembly 107 are not impaired by said seal housing 102.

In the embodiment, said annular disc-shaped portion 202, collar portion 208, and flange portion 216, are formed of a Polyoxymethylene (POM) thermoplastics material, often referred to as acetal. In the specific embodiment said annular disc-shaped portion 202, collar portion 208, and flange portion 216 have a unitary construction, formed by a mechanical machining process performed on an acetal blank. It will of course be appreciated however that a variety of alternative materials and forming methods could be used to create seal housings according to the present invention. As an example, in an alternative embodiment, the main body 201 could be formed using an alternative thermoplastics material using an injection moulding process. As a further alternative, the main body 201 could be formed of a metal, for example, aluminium, using either a mechanical machining or melt casting technique.

Figure 3A:
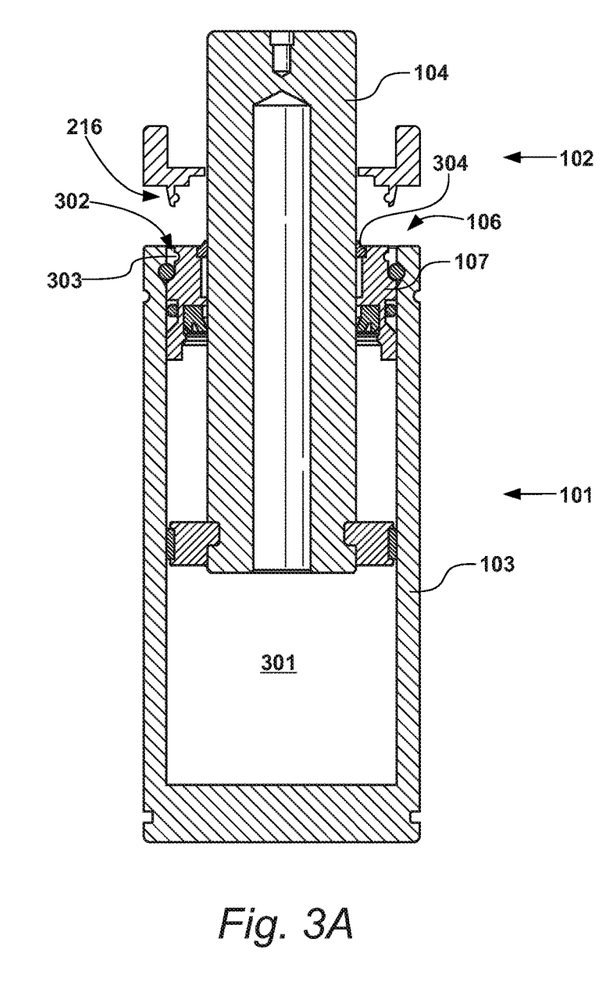
FIGS. 3A and 3B show the gas spring and seal housing in detached and attached conditions respectively.
Figure 3B:
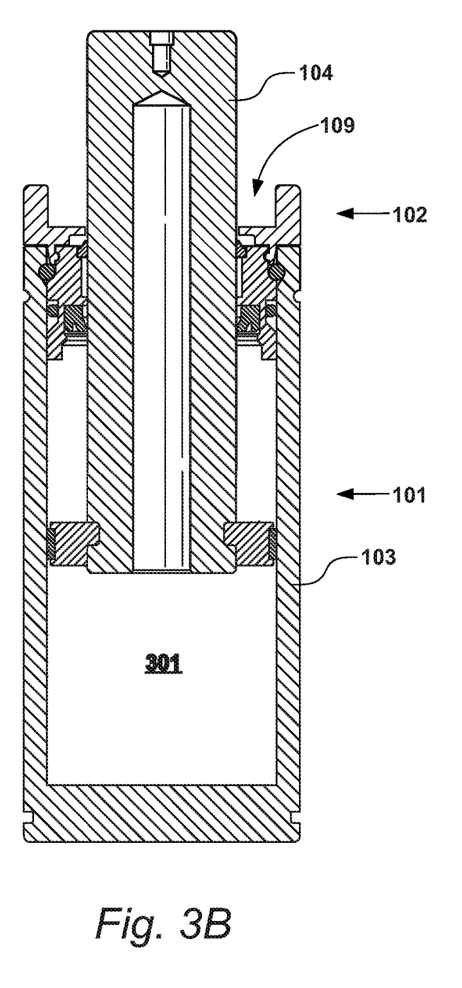

FIGS. 3A & 3B

Gas spring 101 and seal housing 102 are shown in schematic cross-sectional views in FIGS. 3A and 3B. In FIG. 3A the seal housing 102 is shown about to be attached to said gas spring 101, and is shown in FIG. 3B attached to the gas spring 101.

As previously described, gas spring 101 comprises principally of a cylindrical housing 103 defining internally a generally cylindrical compression chamber 301, and an elongate piston 104 reciprocable within the housing 103. Housing 103 defines a circular opening 105 at axial end 106, through which opening 105 the piston 104 extends generally coaxially with the housing 103. Piston sealing assembly 107 is provided annular about said piston 104 interposed in the gap between the exterior of said piston 104 and the inner edge of said housing 103 which defines said opening 105, to form a substantially fluid-tight seal between the piston 104 and the housing 103.

As previously described, said main body 201 of seal housing 102 defines an annular flange portion 216 defining a first portion 221 proximal the base end 217 thereof, and further defining a resiliently compressible bulbous second portion 222 proximal the distal end 218 thereof. In the embodiment, as previously described, said seal housing 102 is configured for releasable attachment to said piston seal assembly 107 of said gas spring 101, by insertion of said annular flange portion 216 into a correspondingly shaped annular channel defined by the gas spring 101. Thus, in the embodiment, said piston seal assembly 107 is shaped so as to define a channel 302 at an upper end thereof between the peripheral edge of the piston seal assembly 107 and the inner surface of said cylindrical housing 103, the channel 302 being open at said axial end 106 of the gas spring 101. Moreover, referring in particular to FIG. 3A, in the embodiment, the peripheral edge of said piston seal assembly 107 defines a concaved portion 303, at which portion the outer edge surface of the seal assembly 107 is concaved inwardly of the sealing assembly 107, such that the cross-sectional profile of said channel 301, defined between said seal assembly 107 and said cylindrical housing 103 corresponds closely to that of said annular flange portion 216. In particular, as shown in the Figures, said concaved portion 303 of said seal assembly is located such that said resiliently compressible bulbous portion 223 of said flange portion 216 may be received therein when said flange portion 216 is inserted into said channel 302.

Referring in particular to FIG. 3B, as previously described, said seal housing 102 may be releasably attached to said gas spring 101 by insertion of said annular flange portion 216 into the channel 302 defined between the piston seal assembly 107 and the cylindrical housing 103 of the gas spring. As will be appreciated, insertion of the flange portion 216 of the seal housing 102 into the channel 302 in this way not only ensures correct alignment of said seal housing 102 with respect to said gas spring 101, i.e, coaxial alignment of said annular seal housing 102 with said piston 104, but also the location of bulbous portion 223 of said flange portion 216 into concaved portion 303 of said channel 302 serves to secure the seal housing 102 to the cylindrical housing 103 of the gas spring 101 in a way that the seal housing 102 will not become detached from the gas spring 101 during normal operation of the gas spring 101.

As will be appreciated, the resiliently compressible characteristic of said resiliently compressible bulbous portion 223 of said flange portion 216 allows for the flange portion 216 to be readily inserted into the channel 302 by width-wise compression of the resiliently compressible portion 222 during insertion, and for the resiliently compressible portion to subsequently expand once inserted to conform closely to the shape of said concaved portion 303 of said channel 302. Moreover, the resiliently flexible nature of said annular flange portion 216, both about its point of attachment to said disc shaped portion 202, and along its length, more easily facilitates correct alignment of the annular flange portion 216 with the channel 302 during insertion.

Referring still to FIG. 3B in particular, it will be noted that, as is conventional, the piston seal assembly 107 of said gas spring 101 comprises a sealing lip 304 which extends slightly upwardly of the plane of the end face 106 of said cylindrical housing 103. It is desirable that said seal housing 102, when attached to said gas spring 101, does not interfere with the operation of said piston seal assembly 107, and more particularly does not contact said sealing lip 304.

Thus, said concaved region 227 of said disc shaped portion 202 is provided adjacent said opening 207 and extending radially outwardly therefrom in order to accommodate sealing lip 304 such that the lower surface 204 of said disc-shaped portion 202 does not contact the sealing lip 304 when the seal housing 101 is abutted against the end face 106 of the gas spring 101.

Figure 4A:
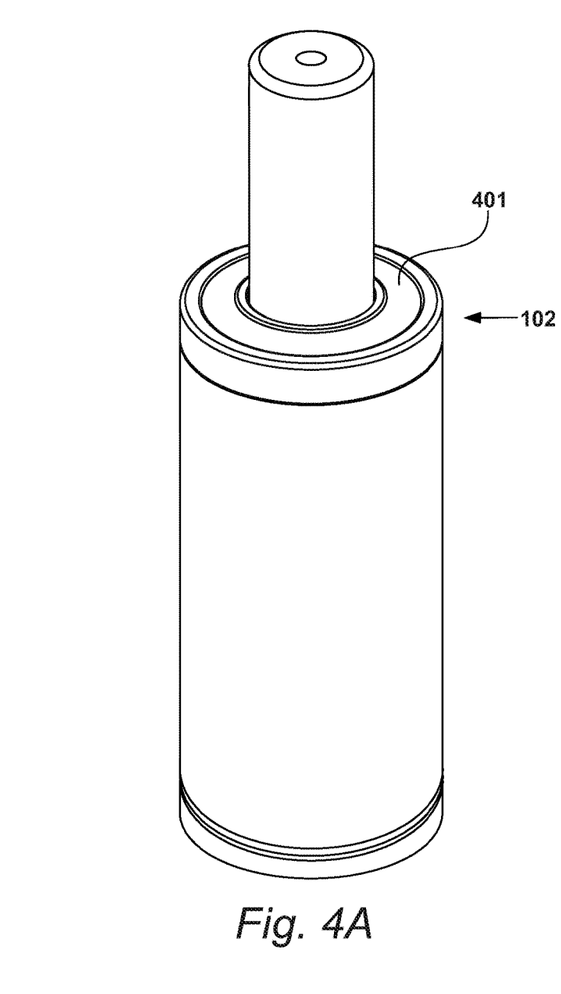
FIGS. 4A and 4B show the gas spring with the seal housing attached in perspective and schematic cross-sectional views respectively.
Figure 4B:
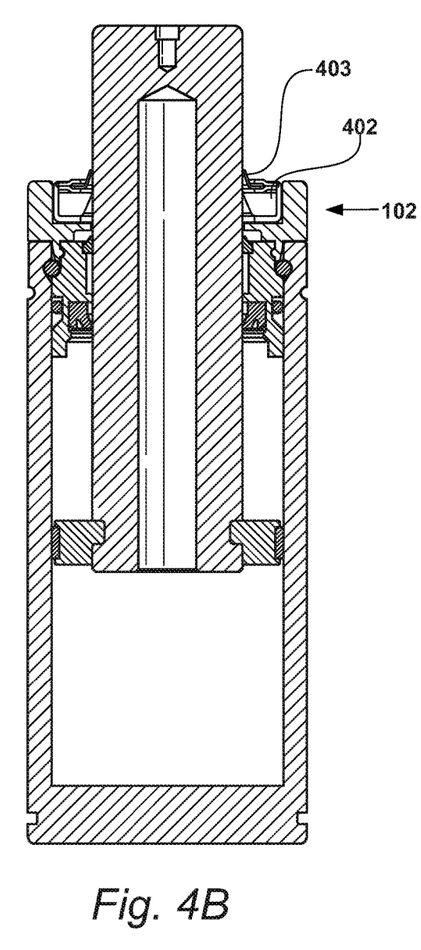

FIGS. 4A & 4B

Gas spring 101 with seal housing 102 attached is shown in FIGS. 4A and 4B, in perspective and schematic cross-sectional views respectively.

Thus, referring in particular, to FIG. 4B, in the specific embodiment, the seal housing 102 is further provided with an annular sealing assembly 401 retained within the volume 109 bounded by the plane 214 of the upper surface of the disc-shaped portion 202, the inner edge 211 of the annular collar portion 208, and a plane 215 aligned with the upper end of the annular collar portion 208. In the specific embodiment, said sealing assembly 401 is a scraper seal assembly, which assembly comprises a 'scraper' sealing lip adapted to scrape contaminants from the exterior surface of said piston 104 as the piston reciprocates within the housing 103.

In the specific embodiment, said scraper seal assembly 401 comprises an annular main body 402, formed of a plastics material, and defining a central circular opening through which said piston 104 may extend, and further comprises a 'scraper' sealing lip 403, which sealing lip 403 is, in the embodiment, formed of a relatively soft metal material, specifically brass in the described embodiment.

Thus, as will be appreciated, said seal housing 102 allows for releasable attachment of an auxiliary piston sealing assembly, in the specific embodiment a 'scraper' seal assembly 401, to a pneumatic or hydraulic cylinder, such as gas spring 101, in a way such that said seal housing 102, and thus said scraper seal assembly 401, may be readily attached to, and detached from, said gas spring 101, without interrupting the operation of the piston seal assembly 107 of said gas spring 101, and without requiring potentially structurally weakening modification of said gas spring cylindrical housing 103. It will thus be appreciated that aspects of the seal housing 102 overcome problems encountered when a single specification of hydraulic or pneumatic cylinder is used in environments with differing contaminant levels, inasmuch that the hydraulic or pneumatic cylinder may be adapted to suit the environment by attachment of an auxiliary sealing assembly, such as scraper seal assembly 401. In this way, the hydraulic or pneumatic cylinder may be provided at the point of manufacturer with a piston seal assembly, such as piston seal assembly 107, that is suited to use of the cylinder in a low contaminant level environment, and an auxiliary piston seal assembly may subsequently be readily attached if the cylinder is to be used in a high contaminant level environment.

What we claim is:

1. A seal housing for releasable attachment to a hydraulic or pneumatic cylinder pre-sealed by a sealing assembly, the seal housing being suitable for retaining a seal assembly auxiliary to said sealing assembly of said hydraulic or pneumatic cylinder and the seal housing comprising a generally annular main body, the annular main body defining:

an annular disc-shaped portion having an upper surface, a lower surface, an outer peripheral edge and an inner edge, said inner edge bounding a circular opening extending the full height of said annular disc shaped portion between said upper and lower surfaces;

an annular collar portion upstanding from the upper surface of said disc shaped portion adjacent said peripheral edge of said disc shaped portion, said annular collar portion extending height-wise from a base end joined to said disc-shaped portion to an upper end, and width-wise from an inner edge to an outer peripheral edge, said inner edge of said annular collar portion bounding a circular opening extending the full height of said annular collar portion; and an annular flange portion extending height-wise downwardly from the lower surface of said disc-shaped portion from a base end joined to said lower surface of said disc-shaped portion to a distal end, and width wise from an inner edge to an outer edge; and wherein said annular flange portion is resiliently flexible relative to said annular disc-shaped portion generally about its base end.

2. The seal housing of claim 1, in which the diameter of said circular opening defined by said annular collar portion is greater than the diameter of said circular opening defined by said annular disc-shaped portion.

3. The seal housing of claim 1, in which said annular disc-shaped portion, said annular collar portion, and said annular flange portion have a unitary construction.

4. The seal housing of claim 1, in which said annular disc-shaped portion, said annular collar portion, and said annular flange portion are defined by a unitary moulding.

5. The seal housing of claim 1, in which said annular disc-shaped portion, said annular collar portion, and said annular flange portion are formed of a Polyoxymethylene (POM) thermoplastics material.

6. The seal housing of claim 1, in which said main body is suitable for retaining an annular seal assembly within the volume bounded by the plane of the upper surface of the annular disc-shaped portion, the inner edge of the annular collar portion, and a plane aligned with the upper end of said annular collar portion.

7. The seal housing of claim 1, further comprising an annular seal assembly retained within the volume bounded by the plane of the upper surface of the annular disc-shaped portion, the inner edge of the annular collar portion, and a plane aligned with the upper end of said annular collar portion.

8. The seal housing of claim 7, in which said annular seal assembly is retained in place by means of an interference fit between an exterior surface of the annular seal assembly and said inner edge of said annular collar portion.

9. The seal housing of claim 7, in which said annular seal assembly comprises a scraper seal defining a sealing lip adapted to scrape contaminants from the surface of the piston of a pneumatic or hydraulic cylinder to which the seal housing may be attached.

10. The seal housing of claim 1, adapted for releasable attachment to a hydraulic or pneumatic cylinder comprising a cylindrical housing defining internally a chamber for receiving a working fluid and defining a circular opening through one end face of the housing, and further comprising a piston axially reciprocable within the housing through the opening; in which said seal housing is configured for attachment to said end face of said housing coaxially with said circular opening; and in which said seal housing is configured for retaining an annular seal assembly comprising a sealing lip in contact with said piston.

11. A hydraulic or pneumatic cylinder comprising:
a cylindrical housing defining internally a chamber for receiving a working fluid and defining a circular opening through one end face of the housing;
a piston axially reciprocable within the housing through the opening;
a sealing assembly installed in the housing opening annular about the piston arranged to provide a substantially fluid tight seal between the piston and the housing; and
a seal housing releasably attached to said end face of said housing, said seal housing retaining an annular seal assembly comprising an annular sealing lip in contact with said piston, said annular seal assembly being auxiliary to said sealing assembly;
in which the seal housing comprises a generally annular main body, the annular main body defining:
an annular disc-shaped portion having an upper surface, a lower surface, an outer peripheral edge and an inner edge, said inner edge bounding a circular opening extending the full height of said annular disc shaped portion between said upper and lower surfaces;
an annular collar portion upstanding from the upper surface of said disc shaped portion adjacent said peripheral edge of said disc shaped portion, said annular collar portion extending height-wise from a base end joined to said disc-shaped portion to an upper end, and width-wise from an inner edge to an outer peripheral edge, said inner edge of said annular collar portion bounding a circular opening extending the full height of said annular collar portion; and
an annular flange portion extending height-wise downwardly from the lower surface of said disc-shaped portion from a base end joined to said lower surface of said disc-shaped portion to a distal end, and width wise from an inner edge to an outer edge; and wherein said annular flange portion is resiliently flexible relative to said annular disc-shaped portion generally about its base end.

12. A seal housing for releasable attachment to a hydraulic or pneumatic cylinder pre-sealed by a sealing assembly, the seal housing being suitable for retaining a seal assembly auxiliary to said sealing assembly of said hydraulic or pneumatic cylinder and the seal housing comprising a generally annular main body, the annular main body defining:
an annular disc-shaped portion having an upper surface, a lower surface, an outer peripheral edge and an inner edge, said inner edge bounding a circular opening extending the full height of said annular disc shaped portion between said upper and lower surfaces;
an annular collar portion upstanding from the upper surface of said disc shaped portion adjacent said peripheral edge of said disc shaped portion, said annular collar portion extending height-wise from a base end joined to said disc-shaped portion to an upper end, and width-wise from an inner edge to an outer peripheral edge, said inner edge of said annular collar portion bounding a circular opening extending the full height of said annular collar portion; and
an annular flange portion extending height-wise downwardly from the lower surface of said disc-shaped portion from a base end joined to said disc-shaped portion to a distal end, and width wise from an inner edge to an outer edge, said inner edge of said annular flange portion bounding a circular opening extending the full height of said annular flange portion, the diameter of said opening defined by said flange portion being greater than the diameter of said opening defined by said annular disc-shaped portion;
in which a first annular region of said lower surface of said annular disc-shaped portion extends in a first plane defining a height-wise lowermost extent of said lower surface of said disc-shaped portion, and in which said lower surface of said annular disc-shaped portion is concaved inwardly of said annular disc-shaped portion away from said first plane at a second annular region, said second annular region being directly adjacent and surrounding said circular opening and extending radially outwards towards the region at which said annular flange portion is joined to said annular disc-shaped portion.

13. The seal housing of claim 12, in which said first and second annular regions of said lower surface of said annular disc-shaped portion are approximately concentric and centred on the centre of said opening of said annular disc shaped portion, said first annular region have a greater radius than said second annular region, and said first annular region extending radially outwards of said second annular region towards said outer peripheral edge of said annular disc-shaped portion.

14. The seal housing of claim 12, further comprising an annular seal assembly retained within the volume bounded by the plane of the upper surface of the annular disc-shaped portion, the inner edge of the annular collar portion, and a plane aligned with the upper end of said annular collar portion.

15. The seal housing of claim 14, in which said annular seal assembly is retained in place by means of an interference fit between an exterior surface of the annular seal assembly and said inner edge of said annular collar portion.

16. The seal housing of claim 14, in which said annular seal assembly comprises a scraper seal defining a sealing lip adapted to scrape contaminants from a surface of a piston of a pneumatic or hydraulic cylinder to which the seal housing may be attached.

17. The seal housing of claim 12, adapted for releasable attachment to a hydraulic or pneumatic cylinder comprising a cylindrical housing defining internally a chamber for receiving a working fluid and defining a circular opening through one end face of the housing, and further comprising a piston axially reciprocable within the housing through the opening; in which said seal housing is configured for attachment to said end face of said housing coaxially with said circular opening; and in which said seal housing is configured for retaining an annular seal assembly in sealing contact with said piston.

* * * * *